US012363752B2

(12) United States Patent
Luo et al.

(10) Patent No.: US 12,363,752 B2
(45) Date of Patent: Jul. 15, 2025

(54) METHODS, SYSTEMS AND DEVICES FOR PROVIDING DIFFERENTIATED QUALITY OF SERVICE FOR WIRELESS COMMUNICATION DEVICES

(71) Applicant: Cypress Semiconductor Corporation, San Jose, CA (US)

(72) Inventors: Hui Luo, Marlboro, NJ (US); Xianmin Wang, Westfield, NJ (US); Hongwei Kong, Basking Ridge, NJ (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/381,111

(22) Filed: Oct. 17, 2023

(65) Prior Publication Data
US 2024/0155662 A1 May 9, 2024

Related U.S. Application Data

(63) Continuation of application No. 17/409,797, filed on Aug. 24, 2021, now Pat. No. 11,825,506, which is a (Continued)

(51) Int. Cl.
*H04W 72/543* (2023.01)
*H04W 72/0446* (2023.01)
(Continued)

(52) U.S. Cl.
CPC ..... *H04W 72/543* (2023.01); *H04W 72/0446* (2013.01); *H04W 72/569* (2023.01);
(Continued)

(58) Field of Classification Search
CPC ............. H04W 72/543; H04W 72/569; H04W 72/0446; H04W 74/04; H04W 84/12; H04W 88/08
See application file for complete search history.

(56) References Cited

U.S. PATENT DOCUMENTS 8,514,825 B1   8/2013   Addepalli et al.
2002/0159418 A1  10/2002  Rudnick et al.
(Continued)

FOREIGN PATENT DOCUMENTS

CN   102427588 A   4/2012
WO   2019125435 A1  6/2019

OTHER PUBLICATIONS

Alcatel-Lucent, Discussion on Trusted WLAN QoS handling, "3GPP TSG-SA WG2 Meeting #106 S2-143923 " Nov. 17-21, 2014; 7 pages.
(Continued)

*Primary Examiner* — Duc C Ho

(57) ABSTRACT

A method can include, in an access point (AP) configured to control data transfers for associated stations (STAs) in time intervals, storing a unique identifier and quality-of-service (QoS) requirement for each STA of a first set in a nonvolatile memory of the AP. In response to a STA associating with the AP, if the associating STA is in the first set, allocating time for the STA in the time intervals to meet the QoS requirement of the STA without receiving transmitted QoS data from the STA, and if the associating STA is not in the first set, establishing a QoS for the STA having a lower priority than any associated STAs of the first set. Corresponding systems and devices are also disclosed.

20 Claims, 15 Drawing Sheets

Related U.S. Application Data continuation of application No. 16/576,469, filed on Sep. 19, 2019, now Pat. No. 11,109,394.

(60) Provisional application No. 62/880,510, filed on Jul. 30, 2019.

(51) Int. Cl.
  H04W 72/566 (2023.01)
  H04W 74/04 (2009.01)
  H04W 84/12 (2009.01)
  H04W 88/08 (2009.01)

(52) U.S. Cl.
  CPC ............ H04W 74/04 (2013.01); *H04W 84/12* (2013.01); *H04W 88/08* (2013.01)

(56) References Cited

U.S. PATENT DOCUMENTS

| | | | |
|---|---|---|---|
| 2011/0225440 A1* | 9/2011 | Kwon | H04W 52/0225 455/127.5 |
| 2012/0224519 A1* | 9/2012 | Kwon | H04B 7/0452 370/329 |
| 2018/0020461 A1 | 1/2018 | Tomeba et al. | |
| 2018/0234902 A1* | 8/2018 | Talbert | H04M 15/8061 |

OTHER PUBLICATIONS

Sun Zhao, Xue Xiao-ping, Dong De-cun, Research on WLAN QoS, "Application Research of Computers, No. 7" Jul. 10, 2006; 4 pages.

* cited by examiner

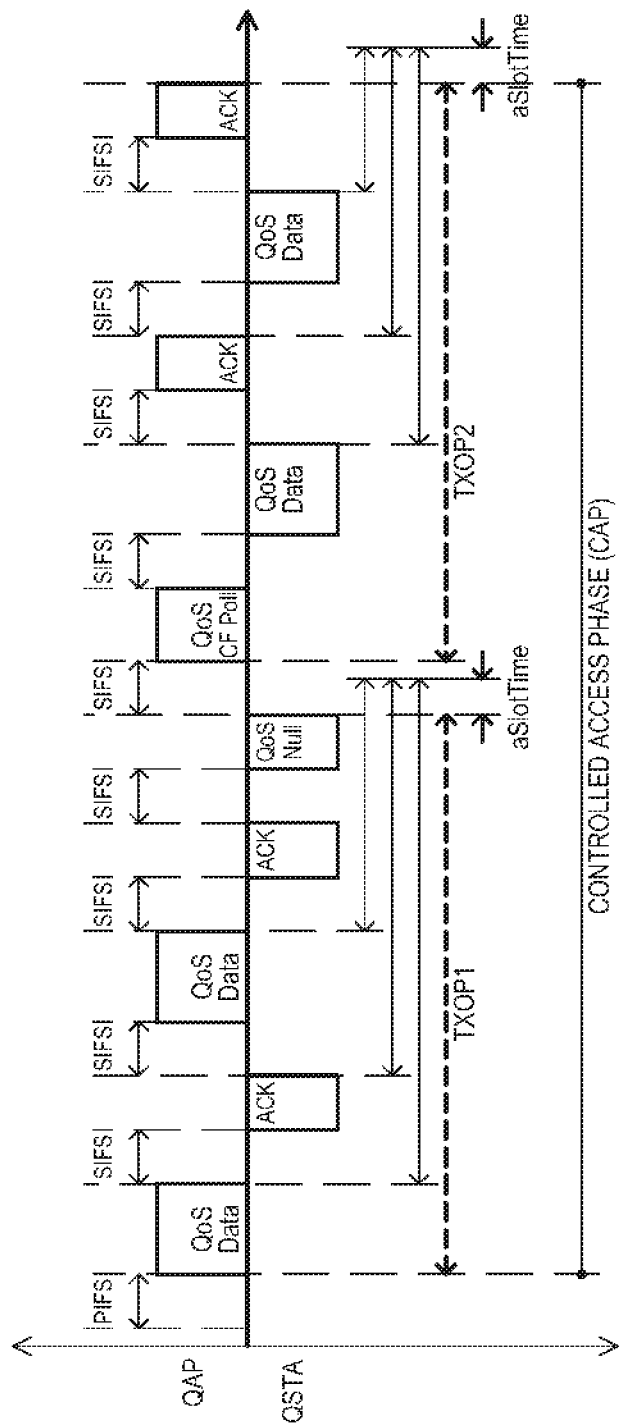

METHODS, SYSTEMS AND DEVICES FOR PROVIDING DIFFERENTIATED QUALITY OF SERVICE FOR WIRELESS COMMUNICATION DEVICES

RELATED APPLICATIONS

The present application is a continuation application of U.S. Non-Provisional application Ser. No. 17/409,797, filed on Aug. 24, 2021 which is a continuation application of U.S. Non-Provisional application Ser. No. 16/576,469, filed on Sep. 19, 2019, now U.S. Pat. No. 11,109,394, issued on Aug. 31, 2021, which claims the priority and benefit of U.S. Provisional Patent Application No. 62/880,510, filed on Jul. 30, 2019, all of which are incorporated by reference herein in their entirety.

TECHNICAL FIELD

The present disclosure relates generally to wireless systems, and more particularly to wireless systems configured to provide some minimum quality-of-service to connected devices.

BACKGROUND

Wi-Fi integrated circuit devices are being added into cars for various infotainment applications. A very common use is to replace audio/video cables between the infotainment console and "on-board" audio/video devices in the cars (such as sound system speakers, back seat video players/game consoles, safety cameras, cabin talking and monitoring systems, etc.). Another use for such devices is to serve as a Wi-Fi access point (AP) to connect other Wi-Fi devices, such as devices that are "brought-in" to the automobile, including smart phones, tablets, and laptops. The Wi-Fi AP can connect devices with each other or to the Internet.

However, as larger numbers of Wi-Fi devices are connected at a restricted site (i.e., a car), bandwidth contention can occur between them, which can negatively impact the connection quality for those on-board Wi-Fi devices, especially audio/video devices. In the case of automobiles, for example, it is desirable to provide a Wi-Fi environment with built-in devices having robust connections with the infotainment console without facing bandwidth contention from brought-in Wi-Fi devices.

Current QoS schemes for Wi-Fi devices include Enhanced Distribution Channel Access (EDCA) (which is a mandatory feature for certification in the Wi-Fi Multimedia (WMM) specification promulgated by the Wi-Fi Alliance (WFA)) and Hybrid Coordination Channel Access (HCCA) (which is considered optional, and not required for any WFA certification program). EDCA cannot prevent a QoS from downgrading when there is heavy bandwidth contention. HCCA is not widely supported. While HCCA can assure QoS, it requires a complicated admission control process and bandwidth-aware scheduling on a first-come-first-serve basis. Thus, neither can effectively address the drawbacks ensuring a QoS for environments like an automobile, having both on-board and brought-in devices.

BRIEF DESCRIPTION OF THE DRAWINGS

FIG. 3 is a diagram of data that can be stored in an access point (AP) configuration parameter block according to an embodiment.

FIG. 4 is a timing diagram showing QoS scheduling according to an embodiment.

DETAILED DESCRIPTION

Figure 1A:
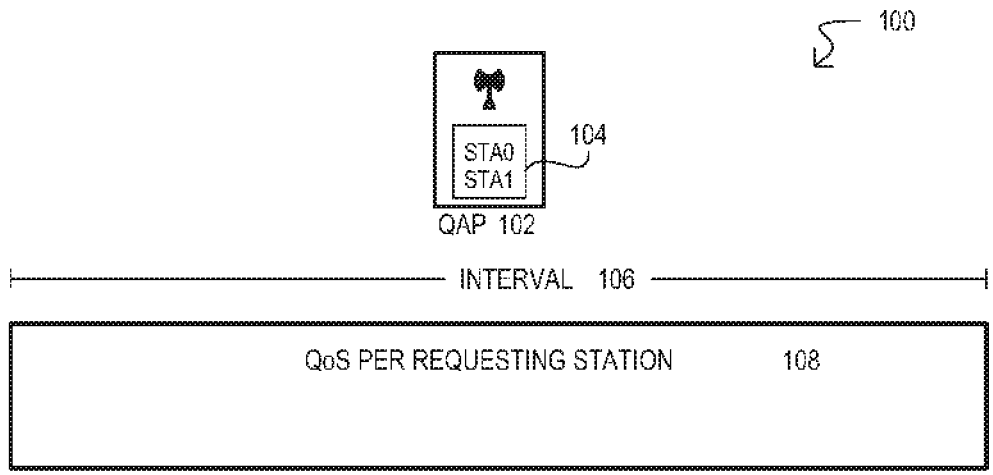
FIGS. 1A to 1C are a sequence of block diagrams showing the operation of a system according to an embodiment.

According to embodiments, an access point (AP) of a wireless system can store information for a number of first type stations (STAs) in nonvolatile memory. The information can include a unique identifier for each first type STA, as well as a quality-of-service (QoS) value for the STA. When a first type STA seeks association with the AP, the AP can allocate time in a service interval that can ensure the QoS (as indicated by its stored QoS value) for first type STA. Such an allocation of time can occur without the stay receiving QoS data from the first type STA. Further, such an allocation of time can occur without the first type STA requesting or negotiating for the QoS. Other STAs (i.e., STAs not of the first type) can have QoS requirements met at a lower priority than the first type STAs.

In some embodiments, an AP can schedule a contention free period (CFP) and a contention period (CP) in each service interval. First type STAs can be serviced in the CFP while other type STAs can be serviced in the CP and not in any CFP reserved for first type STAs.

In some embodiments, an AP can establish target wake times (TWTs) for first type STAs with service periods sufficient meet the QoS of the first type STAs. TWTs for first type STAs can have priority over accesses (including TWTs) for other type STAs.

In some embodiments, an AP can be a "soft AP" in a wireless system for an automobile. First type STAs can be "on-board" devices (e.g., devices that are part of the automobile). Accordingly, on-board devices can receive a priority QoS upon association with the AP, without having to request a particular QoS or negotiate for admission to the wireless system. Consequently, QoS can be maintained for on-board devices even as other wireless devices are brought into the automobile and connected to the soft AP.

In the various embodiments below, like items are referred to by the same reference characters, but with the leading digit(s) corresponding to the figure number.

Figure 1B:
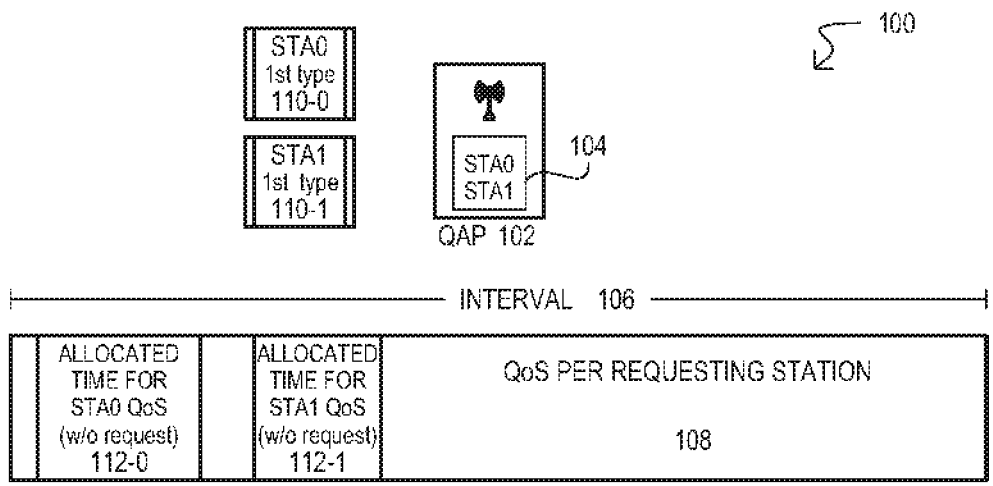
Figure 1C:
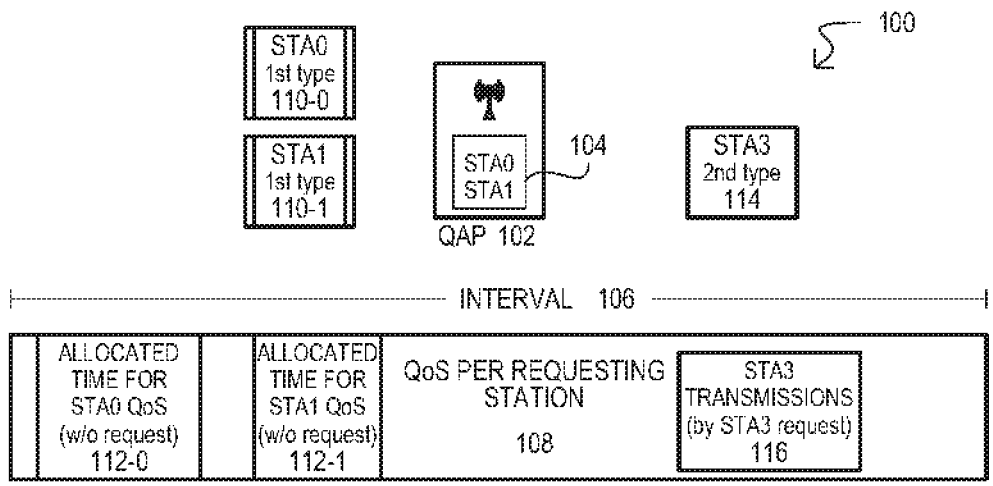

FIGS. 1A to 1C are a sequence of diagrams showing a system 100 according to an embodiment. A system 100 can include an access point 102 to which a number of STAs can associate. An AP 102 can store station values 104 in a nonvolatile fashion. Station values 104 can include a unique identifier and QoS value for a STA. The unique identifier can be transmitted by a STA when it attempts to associate with the AP 102. STAs identified by station values 104 are referred to herein as "first type" STAs and can have a higher priority with respect to QoS than other types of STAs.

An AP can communicate with STAs over service intervals (one shown as 106). In some embodiments, a service interval 106 is not less than the total amount of time needed to provide the indicated QoS for first type STAs, plus some additional time to allow other STAs to join the network.

FIG. 1A shows a system 100 prior to any STAs being associated with AP 102. Absent association with any first type STAs, AP 102 can provide QoS according to some default manner without any predetermined priority. In the embodiment show, AP 102 can provide a "per request" type service 108. Accordingly, AP 102 can provide a particular QoS as requested by STAs when they try to join the network.

FIG. 1B shows a system 100 after the association of two, first type STAs 110-0 and 110-2. Unlike FIG. 1A, the AP 102 has scheduled time allocations 112-0 and 112-1 in interval 106 for the first type STAs 110-0 and 110-1. The scheduling of the time allocations 112-0/1 can occur upon detecting the unique identifier transmitted by the first type STAs 110-0/1 and not in response to any sort of request for service or admission to the system 100 by the STAs. The remainder of interval 106 can be free for access by other STAs according to any suitable fashion, including by request.

Time allocations 112-0/1 are sufficient to meet the QoS values for the first type STAs as indicated by station values 104 stored by AP 102. It is understood that time allocations 112-0/1 need not be contiguous. That is, a time allocation 112-0/1 can include multiple parts distributed within interval 106. While time allocations 112-0/1 can occur at the same time in subsequent intervals, in some embodiments, time allocations 112-0/1 can vary between intervals. However, as long as they are associated with AP 102, first type STAs 110-0/1 will be provided with time allocations 112-0/1.

FIG. 1C shows a system 100 after the association of another STA 114 that is not of the first type (i.e., not identified by station values 104 stored in AP 102). STA 114 can thus be considered a second type STA. Data transfer time on the medium for second type STA 114 can be established by request. That is, STA 114 must request or negotiate for a particular service and have such a service be granted by AP 102. This is in contrast to first type STAs 110-0/1 which can be allocated time upon being detected by AP 102. When associating with AP 102, a second type STA 114 can have a lower priority than first type STAs 110-0/1. That is, time allocated to first type STAs 110-0/1 will not be yielded to accommodate second type STAs 114 absent some special operation. Further, time allocated to second type STA 114 can be taken away to ensure sufficient time for another first type STA. In FIG. 1C, second type STA 114 is given transmission time 116 within interval 106 that is outside of time allocations 112-0/1.

According to embodiments, a wireless system can be deployed in an environment that includes preexisting STAs, which can be conceptualized as "on-board" STAs. On-board STAs can be expected to provide certain functions, and thus require a minimum QoS.

Embodiments can have various features including but not limited to:

1. An AP with a configuration parameter block defining all on-board STAs, including their MAC addresses and requirement bandwidth.
2. An AP that can check if any associating STA is an on-board STA. If there are no on-board STA, AP can run a contention based protocol (e.g., Enhanced Distribution Channel Access (EDCA)) for establishing QoS protocol for an associating STAs. However, this can change when an on-board STA associates with the AP. Upon association with an on-board STA, the AP can run a protocol that can schedule contention free periods (CFPs) (e.g., Hybrid Coordination Channel Access (HCCA)). In the CFPs, the AP can deliver downlink data to on-board STAs and then poll them to send uplink data. Such data transfers are subject to the on-board STAs bandwidth specifications in the AP configuration parameter block. After the CFP finishes, the rest of the STAs (i.e., not on-board STAs) can contend for the medium using a contention based protocol. In embodiments where the AP and on-board STAs are IEEE 802.11ax compatible devices, an AP can schedule TWT sessions in place of CFP and deliver data for on-board STAs in TWT service periods pre-reserved for the on-board STAs. The TWT pre-reserved bandwidth is also subject to the on-board STAs bandwidth specifications in the AP configuration parameter block.

FIGS. 2A to 2F are a sequence of block diagrams showing a system according to an embodiment. FIGS. 2A to 2F can be one example of system 100 shown in FIGS. 1A to 1C. FIGS. 2A to 2F show a system 200 having an AP 202 as well as a number of on-board STAs (STA0 to STA2). On-board STAs (STA0 to STA2) are present in the operating environment but may not always be active (e.g., associated with the AP 202). AP 202 can include a configuration parameter block with nonvolatile memory 204, which can store information for on-board STAs, including a unique station identifier and QoS value. AP 202 can schedule communications over intervals 206.

Figure 2A:
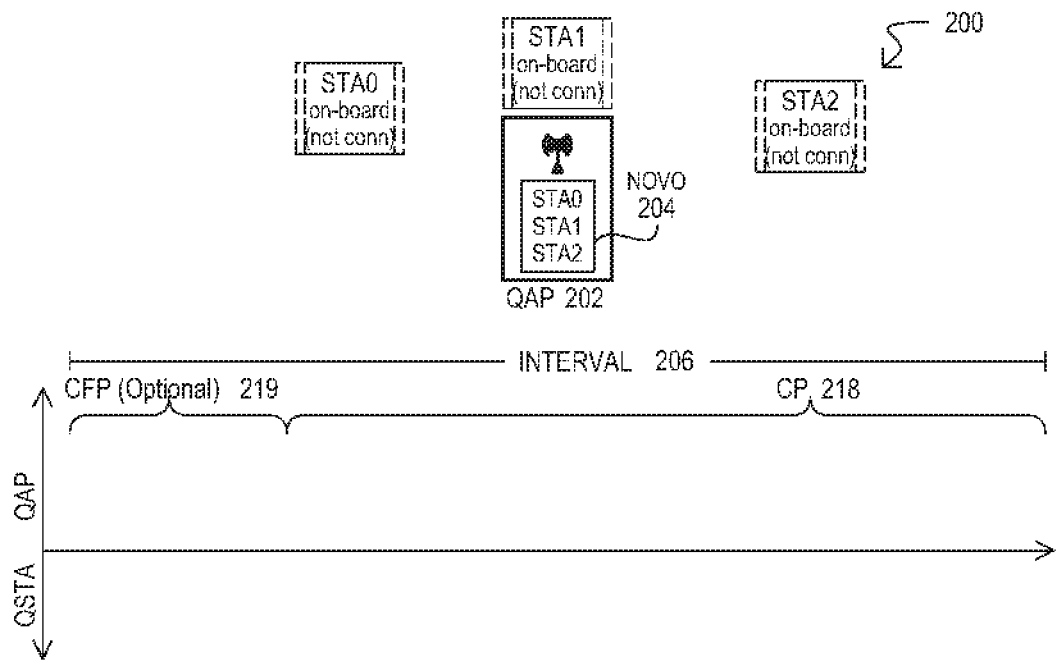
FIGS. 2A to 2F are a sequence of block diagrams showing the operation of a system that can prioritize quality-of-service (QoS) for on-board stations (STAs) by scheduling contention free periods (CFP) according to an embodiment.

FIG. 2A shows system 200 prior to any association with an on-board STA. An interval 206 scheduled by AP 202 can include a contention period (CP) 218, and optionally, a contention free period (219). During CP 218, STAs can communicate with AP 202 to request/negotiate access to the medium. In some embodiments, while no on-board devices are associated, an AP 202 can run EDCA CP (i.e., CP 218 is an EDCA CP).

Figure 2B:
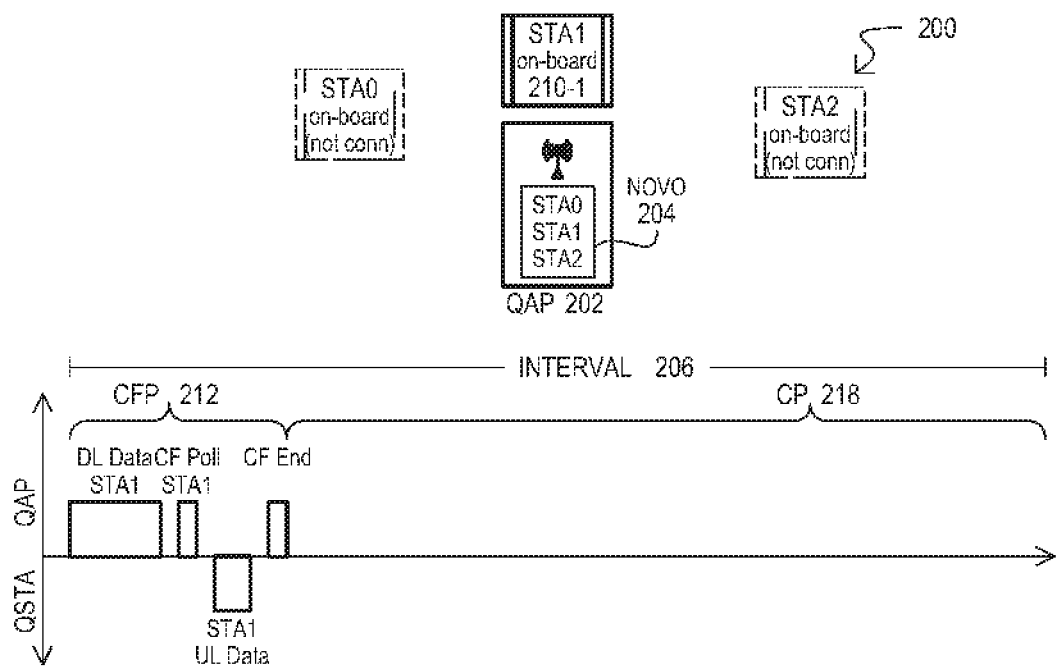

FIG. 2B shows system 200 after on-board STA1 210-1 associates with AP 202. When on-board STA1 210-0 associates with AP 202 it can transmit its unique identifier. When AP 202 determines the unique identifier is stored in nonvolatile memory 204, the AP 202 identifies the STA1 210-1 as an on-board STA and automatically schedules time allocation 212 for STA1 210-1 to ensure the QoS value of the on-board STA1 210-1. The AP 202 executes the scheduling without a QoS request from the on-board STA1 and does not receive QoS data in a transmission from the on-board STA1. In the embodiment shown, time allocation 212 can take the form of a CFP. It is understood that a CFP can be any contention free time period according to any suitable protocol, and so can include periods scheduled within a CP, such as a control access period (CAP), as but one example. In some embodiments, an AP 202 can run an HCCA CFP and EDCA CP (i.e., CFP 212 is a HCCA CFP and CP 218 is an EDCA CP).

Referring still to FIG. 2B, in the embodiment shown, within CFP 212 AP 202 can transfer any downlink data (e.g., data from AP to the STA) and then poll the STA (CF Poll STA1) for any uplink data (e.g., data from STA to AP). The on-board STA1 210-1 can then transmit any data or indicate it has no data to send. An AP 202 can indicate the end of the CP 212 with a CF end transmission. In some embodiments, such a data transfer can include a transmit opportunity (TXOP) for one device (e.g., AP 202) followed by a TXOP for the other device (e.g., STA1 210-1).

Figure 2C:
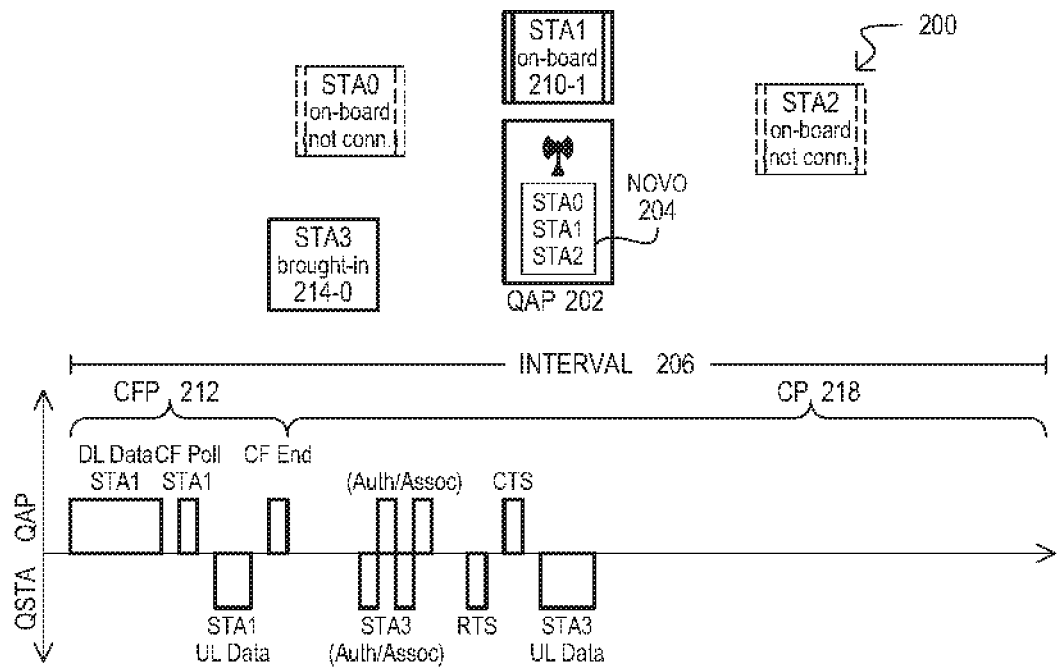

FIG. 2C shows system 200 when a brought-in STA 214-0 associates with AP 202. AP 202 and on-board STA 210-1 can continue to execute data transfers in a scheduled CP 212. In contrast to an on-board device, which is automatically given a time allocation, a brought-in STA 214-0 can undergo an association and authentication process (Auth/Assoc). If the brought-in STA 214-0 is compatible with a QoS process, it can request admission to the medium to establish its own QoS requirement. Once associated, data transfers for brought-in STA 214-0 can then proceed in a contention based manner. In the embodiment shown, this can include a Request-to-Send (RTS), Clear-to-Send (CTS) type procedure. In some embodiments, CFP 212 can be a HCCA CFP and CP 218 can be an EDCA CP.

Figure 2D:
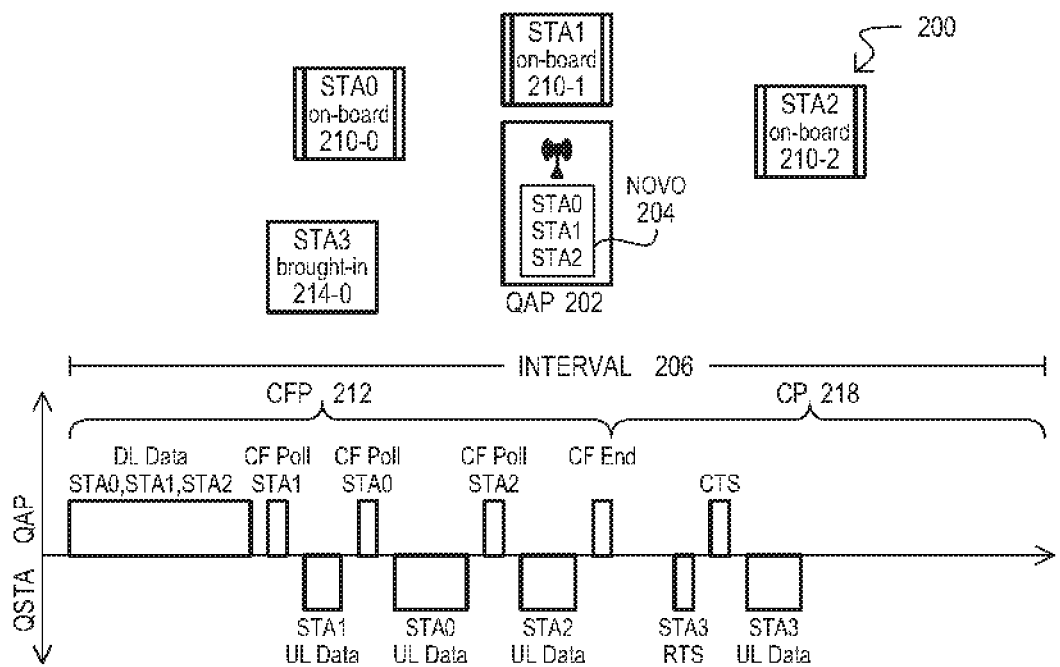

FIG. 2D shows system 200 after two more on-board STAs 210-0 and 210-2 associate with AP 202. AP 202 increases a CFP 212 to ensure a QoS can be met for the newly added on-board STAs 210-0/2. In the embodiment shown, AP 202 can transmit DL data and poll for uplink data from the associated on-board STAs (210-0 to -2). It is noted that an AP 202 could also schedule one or more other CFP for newly associated on-board STAs 210-0/2 (i.e., on-board STAs do not have to be serviced in a same CFP). Data transfers for brought-in STA 214-0 continue to occur in CP 218. In some embodiments, CFP 212 can be a HCCA CFP and CP 218 can be an EDCA CP.

Figure 2E:
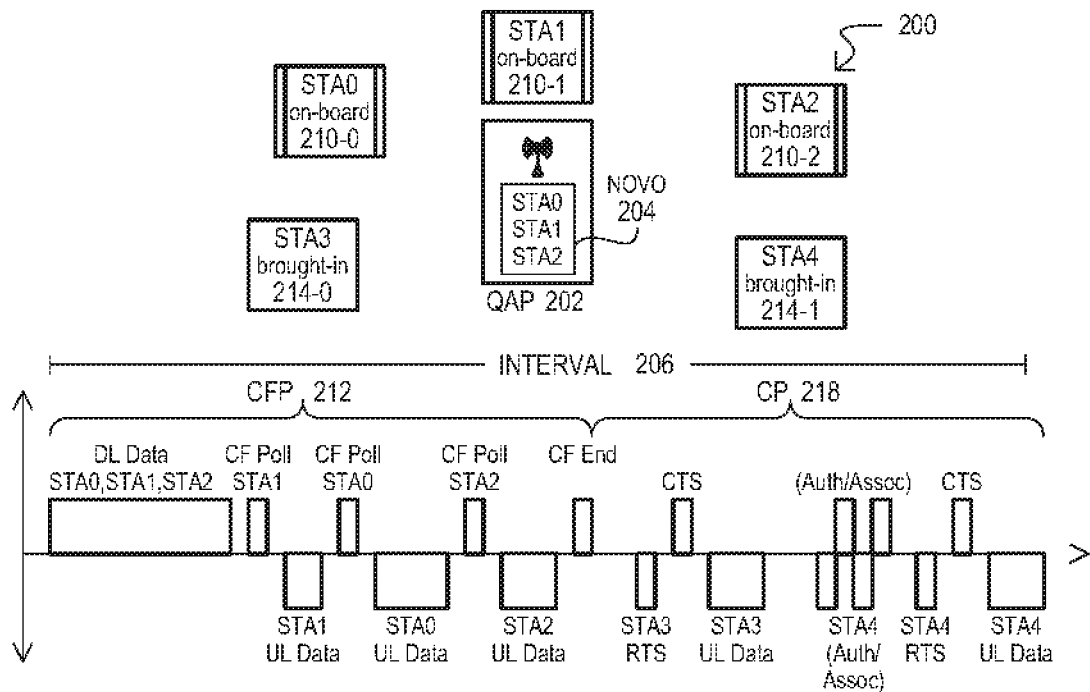

FIG. 2E shows A system 200 when a second brought-in STA4 214-1 associates with AP 202. Data transfers between AP 202 and on-board STAs (210-0 to -2) can continue in one or more scheduled CFPs 212. Second brought-in STA4 214-1 can authenticate and association with the AP 202, as in the case of first brought-in STA3 214-0. Further, if a STA4 214-1 is compatible with a QoS protocol, it can request admission to the system at given QoS value. Data transfers between AP 202 and brought-in STAs (214-0/1) can occur in CP 218. In some embodiments, CFP 212 can be a HCCA CFP and CP 218 can be an EDCA CP.

Figure 2F:
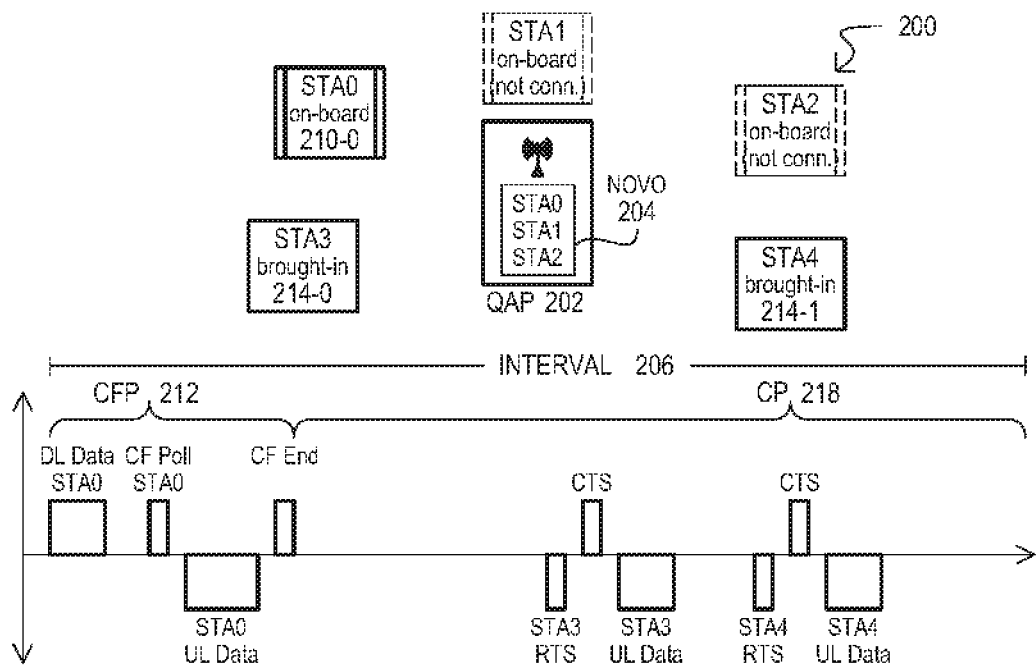

FIG. 2F shows system 200 when two on-board STAs 210-1/2 disconnect from the system 200. In response, AP 202 yields time allocations for such on-board STAs 210-1/2. In the embodiment shown, a duration of CFP 212 can be reduced correspondingly. Data transfers for brought-in STAs 214-0/1 can continue in CP 218. In the event all on-board STAs disconnect from AP 202, a system 200 can return to the state shown in FIG. 2A, establishing QoS with contention based access only.

In some embodiments, a system 200 can be compatible with an IEEE 802.11 wireless standard.

According to embodiments, APs can include a configuration parameter block which can store, in a nonvolatile fashion, station identifiers with corresponding QoS requirements. Such data values can take any form suitable for the standard/protocol employed by the wireless system. FIG. 3 shows one example of such a configuration parameter. Configuration parameter 320 can include a MAC address 320-0 for each on-board STA, along with a QoS level 320-1 for that on-board STA.

While embodiments can provide for automatic QoS time reservation according to any suitable protocol, some embodiments can leverage existing features of IEEE wireless standards. FIG. 4 is a timing diagram showing one such embodiment. The scheduling shown in FIG. 4 can be executed by an AP.

Referring to FIG. 4, an AP can execute a number of steps to provide an indicated QoS to on-board STAs having a priority over other (e.g., brought-in) STAs. In some embodiments, the AP can be a software enabled access point (soft AP). A soft AP can include instructions executed by one or more processors in a computing device, not specifically designed to provide a wireless network, to enable the computing device to operate as an AP. FIG. 4 shows timing spaces according to standards, including a PCF interframe space (PIFS), short interframe space (SIFS), and slot timing (aSlotTime). Also shown are data transfers (QoS Data) as well as acknowledgements (ACK).

The AP can store information for on-board STAs as shown in FIG. 3, and can perform the following functions:
  1. The soft AP can run EDCA until one or more STAs with a MAC address matching the on-board device list associates with the soft AP.
  2. If there are downlink data for the associating on-board STAs, the soft AP can start a HCCA CFP and transmits the downlink data based on the bandwidth requirement specified in the on-board device list (see TXOP1 in FIG. 4). If the downlink data contain a mixture of different access category (AC) data, the soft AP can prioritize AC audio and AC video over other AC data.
  3. The soft AP can send a QoS CF polling frame to start HCCA CFP for uplink data. The associated on-board STAs can be polled one by one to send uplink data based on their bandwidth requirements (see TXOP2 of FIG. 4). Every polled STA can send a CF NULL to indicate it has finished sending uplink data in the round or to indicate it does not have uplink data to send. If a polled on-board STA has a mixture of different AC data, it can prioritize AC audio and AC video over other AC data during uplink transmission.
  4. After finishing one round of downlink and uplink CFPs, by system design there can be left-over bandwidth before the next round of CFPs. The soft AP can then let the system enter CP and run EDCA as the QoS mechanism. If there are left-over low-priority AC data for both uplink and downlink temporarily exceeding the requested bandwidth, both the soft AP and STAs can compete the channel for transmission.
  5. After all on-board STAs disassociate with the soft AP, the soft AP can run EDCA.

Embodiments can use any suitable method to automatically allocate QoS time when an associating station is detected from a stored list. For example, while embodiments herein describe the scheduling of CFPs, other embodiments can use different scheduling features. For example, some systems can be compatible with a standard that includes target wake times (TWTs) (i.e., IEEE 802.11ax). TWTs can be time periods in an interval reserved for a specific STA. Data transfers can occur for a STA during its service period of TWT, and the STA can be in a non-receiving (e.g., sleep)

mode otherwise. In such embodiments, an AP can schedule TWTs with service periods sufficient to provide the QoS indicated (in nonvolatile storage on the AP) for the on-board STA.

For example, in a case where a soft AP and on-board STAs support TWT feature as defined in 802.11ax, an AP can be configured to assure the allocation of TWT slots that are not under heavy contention, and to assure the aggregated bandwidth of on-board STAs are preserved in the service periods of TWT. Embodiments can include various methods to avoid undue contention, including but not limited to:

1. The soft AP can run HCCA (i.e., waits only PIFS to enter a TWT slot), so that it can maximize its chance to seize the channel for the TWT slot. In the case of dense deployment where there are multiple APs, every AP can wait PIFS at a probability of about 1/N, where N is the expected average number of colliding TWT service periods scheduled by overlapping networks (e.g., basic service sets, BSSs). This can avoid wasting bandwidth caused by two or more APs persistently having collided TWT slots.
2. When a soft AP starts scheduling TWT slots, it can add a small amount of randomness on top of the calculated service period of TWT sessions, such that the scheduled TWT sessions won't have identical service periods with TWT sessions scheduled by other APs in the nearby overlapping BSSs. This can avoid TWT slot collision between overlapping BSSs due to identical TWT timing and cycles.

Figure 5:
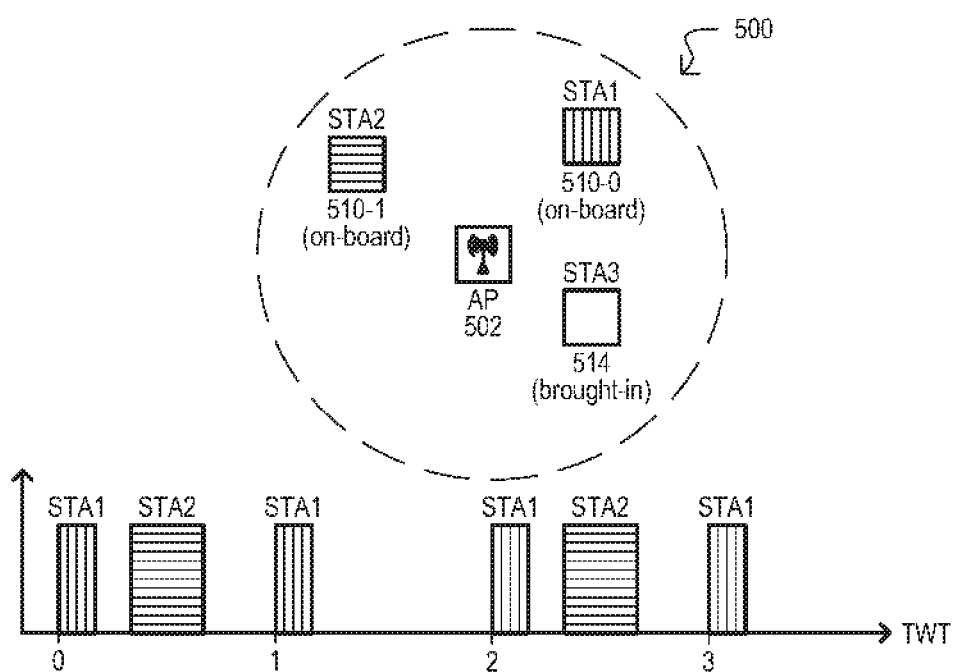
FIG. 5 is a diagram of a system that can prioritize QoS for on-board STAs by scheduling target wake times (TWTs) according to an embodiment.

An embodiment utilizing TWT will now be with reference to FIG. 5.

FIG. 5 is a block diagram of a system having an AP, which can be a soft AP, that can guarantee the bandwidth for on-board STAs using pre-allocation and reservation of TWT slots. In the embodiment shown, a system can be a basic service set (BSS) 500 that includes AP 502, two on-board STAs 510-0/1 and one brought-in STA 514. AP 502 and on-board STAs 510-0/1 can support the TWT feature compatible with the IEEE 802.11ax standard.

Once associated with AP 502, on-board STAs 510-0/1 can send TWT requests to AP 502 with a service period (SP) and service interval (SI) requirement sufficient to ensure their QoS. In AP 502, SPs of on-board STAs 510-0/1 can be allocated in the time domain without overlapping. This is shown in FIG. 5, by TWT slots labeled STA1 and STA2. The QoS requirement for STA1 can result in its TWT being scheduled with greater frequency (though less expected data transfer) that that for STA2.

Timeslot allocation for the on-board STAs 510-0/1 (and any other on-board STAs known by AP) can be pre-allocated and reserved by a time division multiplexing (TDM) scheduler of the AP 502 according to the MAC addresses of the on-board STAs 510-0/1. The timeslot reservations can be one-to-one mappings to on-board STAs identified by on-board station information stored by AP 502. If an on-board STA associates with the BSS 500, the corresponding timeslot reservation is activated and assigned solely to the on-board STA. If an on-board STA of a reserved timeslot is not detected, then the timeslot is identified as inactive, and can be used for contention based accesses (e.g., EDCA) or lower priority TWT sessions for brought-in STAs.

According to embodiments, on-board STAs maintain a priority on QoS over brought-in STAs. Accordingly, if a reserved timeslot has been allocated for brought-in STA when the corresponding on-board STA joins the BSS 500, then the AP 502 can re-allocate the reserved timeslot solely for the joining on-board STA, and re-schedule the TWT session for the impacted brought-in STA if necessary.

Figure 6A:
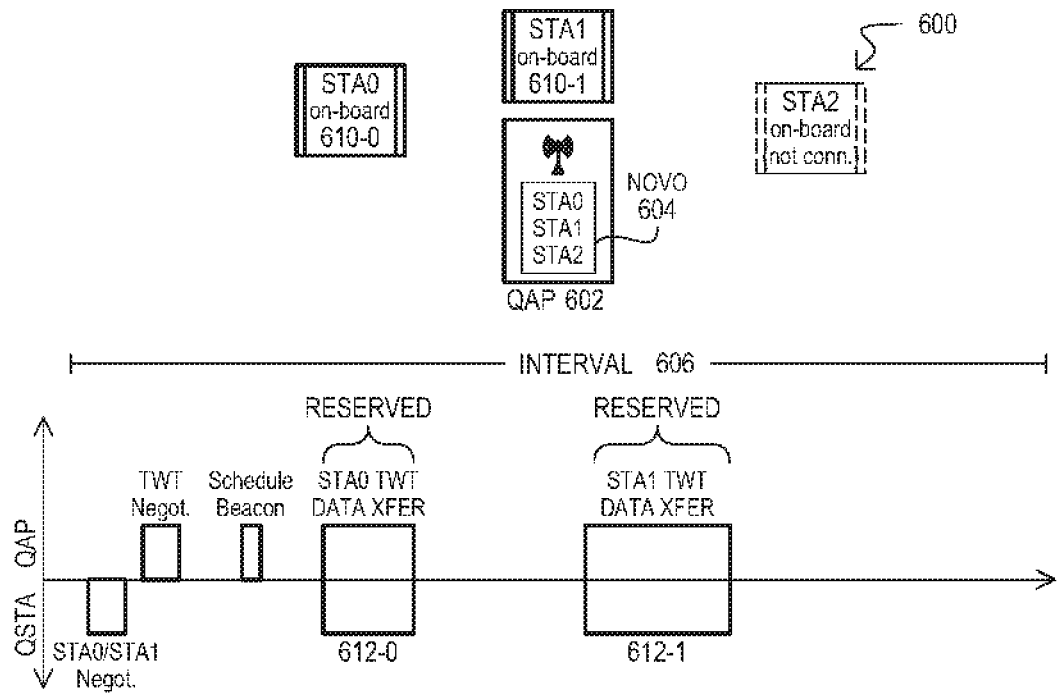
FIGS. 6A and 6B are diagrams showing another system that can prioritize QoS for on-board STAs by scheduling TWTs according to another embodiment.
Figure 6B:
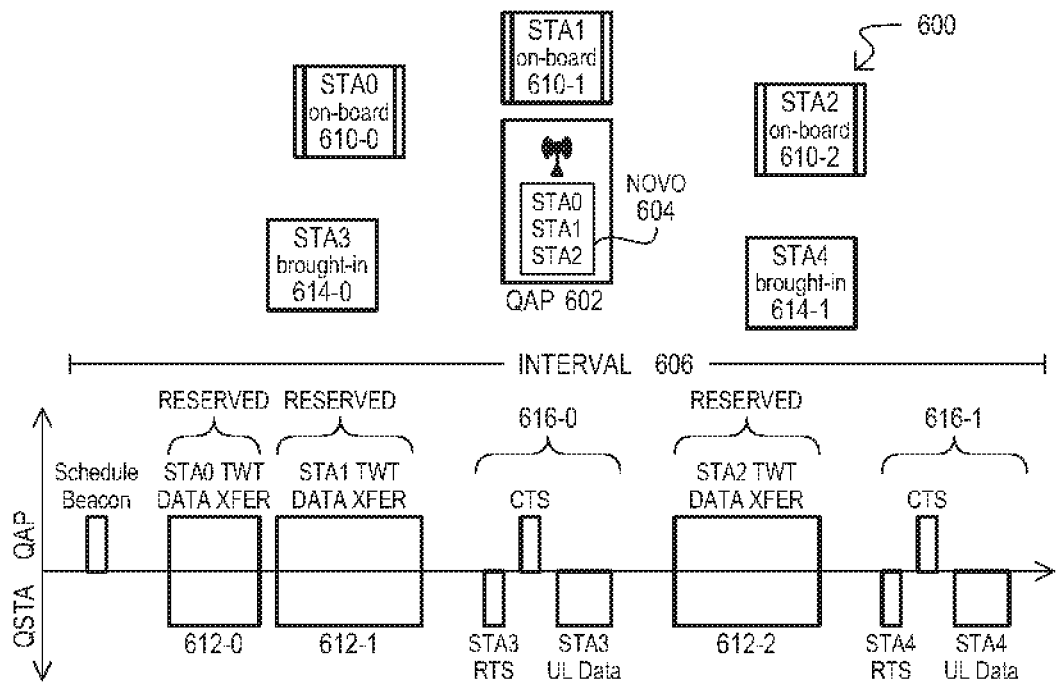

FIGS. 6A and 6B are block diagrams showing a system according to another embodiment. FIGS. 6A and 6B show a system like that of FIGS. 2A to 2F but with an AP utilizing TWT scheduling to ensure QoS for on-board devices.

FIG. 6A shows system 600 during the association of on-board STAs 610-0 and 610-1. In response to receiving the unique identifiers for the associating on-board STAs 610-0/1, AP 602 can reserve TWT slots 612-0 and 612-1, respectively. A duration and frequency of the TWTs 612-0/1 are selected to meet the SP and SI of each on-board STA 610-0/1.

Referring still to FIG. 6A, TWTs can be established in a broadcast fashion and/or individual fashion. In the broadcast case, an AP 602 can send a beacon (Schedule Beacon) which can indicate to on-board STAs 610-0/1 the schedule of their TWTs 612-0/1. In the individual case, an AP 602 can reserve some periodic service time for on-board STAs 610-0/1 once the STAs associates with the AP 602, and the AP 602 will not release such periodic service time for any other STAs. When the on-board STAs 610-0/1 negotiates for a TWT session with the AP 602 (STA0/STA1 Negot. and TWT Negot.), the AP can assign the reserved periodic service time to the on-board STAs 610-0/1. That is, the service time is reserved upon association, and can already be available when an individual TWT negotiation starts.

FIG. 6B shows system 600 after the association of one more on-board STA 610-2 and two brought-in STAs 614-0/1. TWT slot 612-2 has been allocated to on-board STA2 610-2. Data transfers for brought-in STAs 614-0/1 can be execute in the same interval 606 but at times other than TWT slots 612-0/1/2. In the particular embodiment shown, data transfers for brought-in STAs 614-0/1 can occur in contention periods, however this should not be construed as limiting. A brought-in STA could negotiate for its own TWT slot, however, such a slot would have a lower priority than any TWT slots for on-board STAs, as noted herein.

The various operations described herein can be executed by APs in any suitable manner. In some embodiments, such operations can be executed with microcode and firmware present in MAC layer circuits of a WLAN AP device. However, such a particular implementation should not be construed as limiting.

Figure 7:
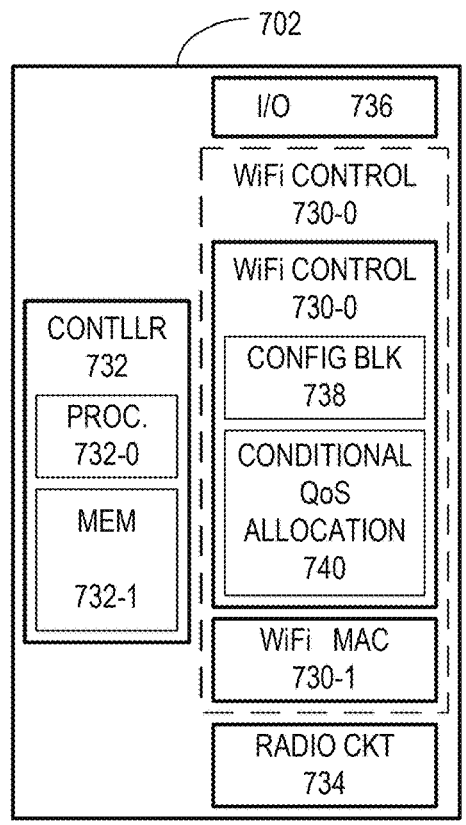
FIG. 7 is a block diagram of an AP device according to an embodiment.

FIG. 7 is a block diagram of a device 702 according to an embodiment. In some embodiments, device 702 can be one implementation of an AP as described herein. A device 702 can include communication circuits 730, a controller 732, radio circuits 734, and input/output (I/O) circuits 736. Communication circuits 730 can be WLAN circuits, including a Wi-Fi control circuit 730-0 and MAC layer circuits 730-1. Communication circuits 730 and radio circuits 734 can be configured to operate in any suitable band, including but not limited to a 2.4 GHz band, 5.0 GHz band and/or 6.0 GHz band.

Wi-Fi control circuits 730-0 can include configuration block 738 and an allocation section 740. Configuration block 738 can include nonvolatile storage elements that store MAC values and QoS values for on-board STAs. From such values, allocation section 740 can schedule time allocations for on-board STAs upon association as described herein, or equivalents. Allocation section 740 can include any suitable arithmetic-logic circuits to establish time allocations. Arithmetic-logic circuits can include fixed logic, programmable logic, one or more processors executing instructions, and any combination thereof.

Radio circuits 734 can include circuits for receiving and transmitting signals according to at least one standard or protocol. Radio circuits 734 can include any suitable circuits according to a selected protocol, and in some embodiments can include physical interface (PHY) circuits and baseband circuits. In some embodiments, radio circuits 734 can transmit/receive on any internationally recognized industrial, scientific, or medical (ISM) band. In some embodiments, radio circuits 734 can be compatible with an IEEE 802.11 standard, such as the IEEE 802.11ax standard.

A controller 732 can control operations of communication circuits 730. In some embodiments, a controller 732 can include circuits (or instructions executable by circuits) for determining when transmission are to be made, as well as which data are included in transmissions. In the embodiment shown, a controller 732 can include a processor section 732-0 and a memory section 732-1

I/O circuits 736 can enable control of device 702 by inputs external to the device 702. I/O circuits 736 can include circuits to enable communication with the device 702 according to any suitable method, including any of various serial data communication standards/methods including but not limited to: serial digital interface (SDI), universal serial bus (USB), universal asynchronous receiver transmitter (UART), I2C, or I2S.

In some embodiments, device 702 can be an integrated circuit device, with the various portions being included in one integrated circuit package or formed in a same integrated circuit substrate.

Figure 8:
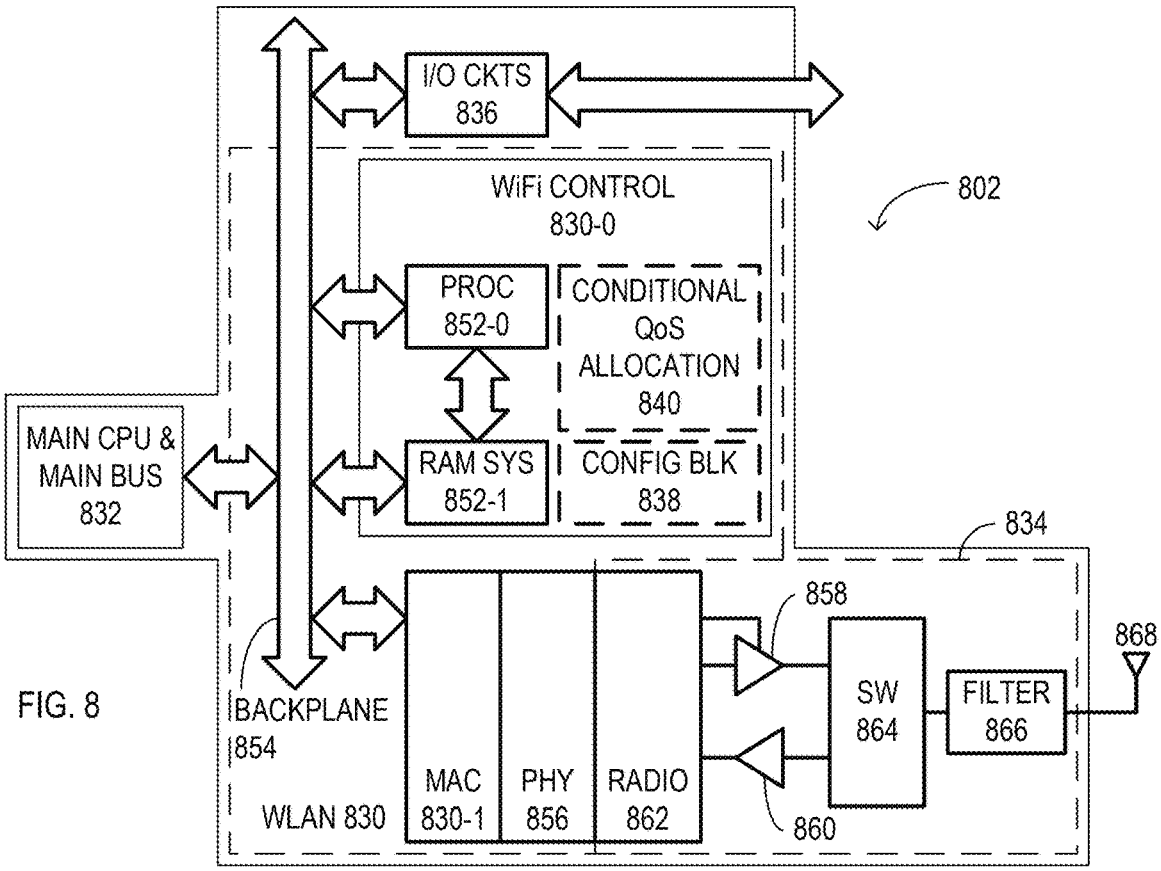
FIG. 8 is a block diagram of an AP device according to another embodiment.

FIG. 8 is a block diagram of a device 802 according to another embodiment. A device 802 can be an AP as described in various embodiments herein, and equivalents. A device 802 can include communication circuits 830, a controller 832, radio section 834, I/O circuits 836, and an antenna connection 868. Communication circuits 830 can include WLAN control circuits 830-0, MAC layer circuits 830-1, and physical layer (PHY) circuits 856.

WLAN control circuits 830-0 can enable communication to occur compatible with one or more communication standards, including any of the IEEE 802.11 wireless standard. In the embodiment of FIG. 8, WLAN control circuits 830-0 can include a processor section 852-0 and a memory system 852-1. A processor section 852-0 can include one or more processors configured to execute instructions stored in memory system 852-1. A processor section 852-0 can include one or more general purpose processors and/or application specific processors. A memory system 852-1 can include various memory types, including nonvolatile memory for storing configuration block 838, memory for storing instructions executable by processor section 852-0, and memory for use by processor section 852-0. In some embodiments, memory system 852-1 can include random access volatile memory (e.g., dynamic and/or static RAM), as well as nonvolatile read-only-memory (e.g., flash memory).

WLAN control circuits 830-0 can provide various functions, including a QoS allocation function 840. A QoS allocation function 840 can establish time allocation for on-board STAs indicated by on-board list 838 according to embodiments herein and equivalents.

MAC layer circuits 830-1 can perform MAC layer operations, including the incorporation of suitable headers, error correction and length fields, as well as fragmentation and reassembly of data frames. MAC layer circuits 830-1 can receive data from and send data to WLAN control circuits 830-0 over a backplane 854. PHY layer circuits 856 can perform PHY layer operations, including but not limited to converting MAC layer data into a format suitable for the wireless medium being used, as well as controlling the modulation of outgoing data frames and the demodulation of incoming data frames.

A radio section 834 can include radio circuits 862, power amplifier circuits 858, low noise amplifier (LNA) circuits 860, switch circuits 864, and filter circuits 866. Radio circuits 862 can convert data frames into suitable radio signals for transmission, as well as receive radio signals for demodulation into data frames. Power amplifier circuits 858 can establish a transmission power for data frames. LNA circuits 860 can amplify received signals for processing by radio circuits 862. Switch circuits 864 can selectively switch antenna connection 868 between power amplifier circuits 858 and LNA circuits 860. Filter circuits 866 can filter received signals according to the medium used. Antenna connection 868 can be configured to connect to an antenna assembly. While FIG. 8 shows one antenna connection, embodiments can include multiple antenna connections.

While embodiments can include any of the methods described in conjunction with the above embodiments, additional method will now be described.

Figure 9:
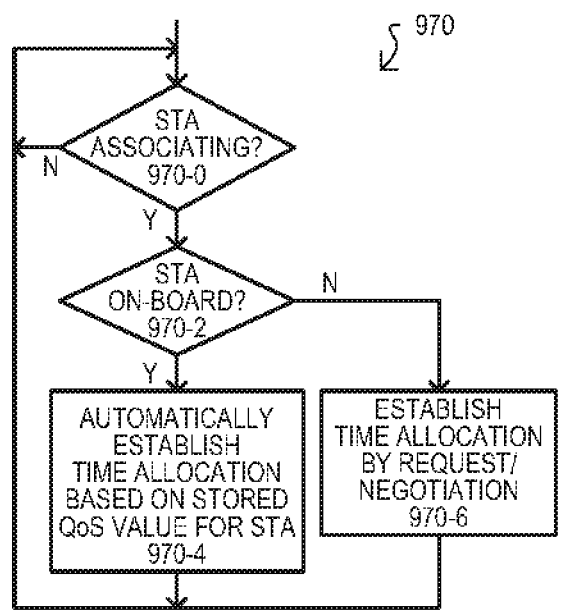
FIG. 9 is a flow diagram of a method for prioritizing QoS according to an embodiment.

FIG. 9 is a flow diagram of a method 970 that can be executed by an AP such as those described herein and equivalents. A method 970 can include determining if a STA is associating with the AP 970-0. Such an action can include an AP monitoring one or more channels for predetermined signals defined by a standard or protocol. If a STA is associating with the AP (Y from 970-0), a method 970 can determine of the STA is an "on-board" STA 970-2. Such an action can include receiving a unique station identifier from the STA and comparing to station identifiers stored in nonvolatile memory of the AP.

If the associating STA is an on-board STA (Y from 970-2) a method 970 can automatically establish a time allocation for the on-board STA based on QoS values stored in the AP for the STA 970-4. Such an action can include establishing one or more periods of time in which data transfers between the AP and the on-board STA can occur. This can be according to any of the embodiments described herein and equivalents, including scheduling a contention free period (e.g., CFP or CAP) or a TWT. If the associating STA is not an on-board STA (N from 970-2), a method 970 can establish a time allocation for the STA by a request or negotiation process (970-6). Such an action can include a STA transmitting QoS requirements to the AP, and the AP determining if enough bandwidth exists for the STA's QoS. Such a bandwidth determination can be made with time allocated to on-board STAs having priority over other (not on-board) STAs.

Figure 10:
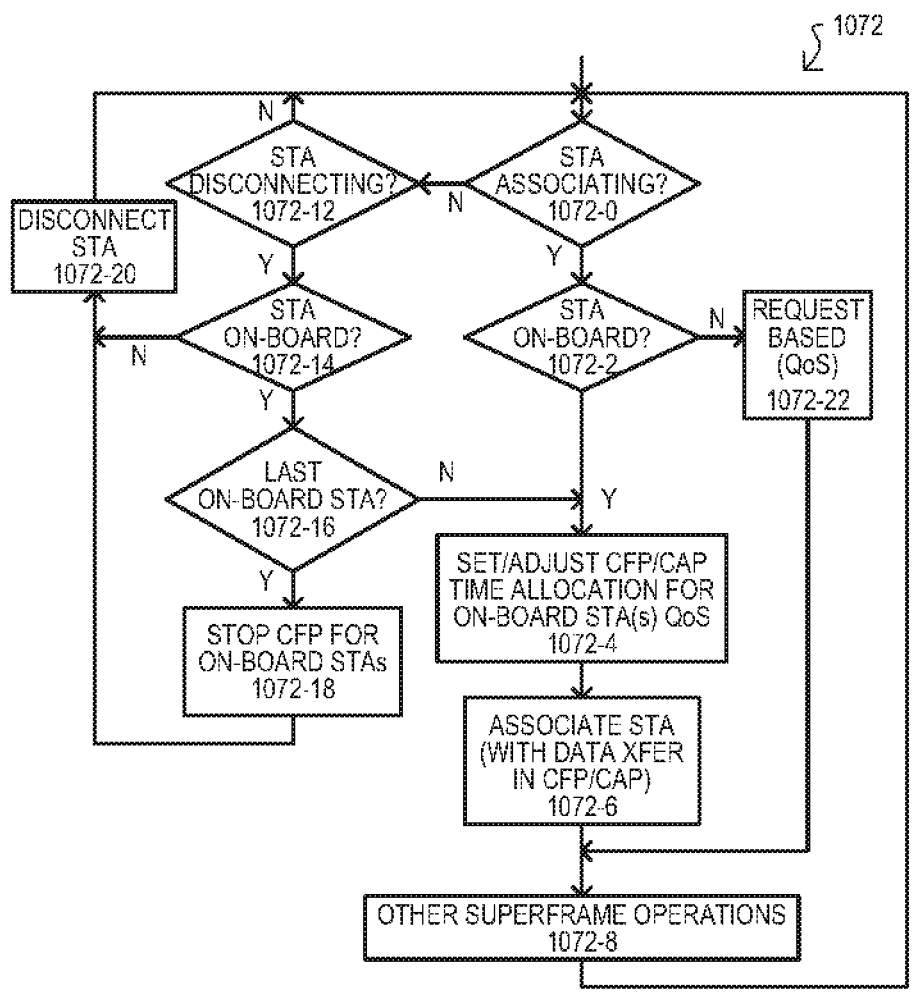
FIG. 10 is a flow diagram of method for scheduling CFP for on-board STAs according to an embodiment.

FIG. 10 is a flow diagram of a method 1072 according to another embodiment. A method 1072 can be executed by an AP operating according to a standard that can schedule contention free periods (CFP and/or CAP) as well as CPs, including but not limited to HCCA. An AP can have a configuration block that stores information for a set of on-board STAs in nonvolatile memory, including MAC addresses and QoS values.

A method 1072 can include determining if a STA is associating with the AP 1072-0. If a STA is associating with the AP (Y from 1072-0), the AP can determine if it is an on-board STA 1072-2. Such an action can include matching a received MAC address with the on-board list. If the STA is an on-board STA (Y from 1072-2), an AP can set (if it is a first on-board STA) or adjust (if an on-board STA is being added or removed) a CFP/CAP with time allocated to meet the QoS of all currently associated on-board STAs 1072-4.

The on-board STA can then be associated and scheduled for data transfers in the allocated CFP/CAP 1072-6. A method 1072 can then execute other superframe operations 1072-10, including but not limited to returning to, or initiating a contention period for data transfers for other STAs.

A method 1072 can also include determining if a STA is disconnecting from the AP 1072-12. If a STA is disconnecting (Y from 1072-12), a method 1072 can determine if it is an on-board STA 1072-14. If the disconnecting STA is not an on-board STA (N from 1072-14), the STA can be disconnected 1072-20. If the disconnecting STA is an on-board STA (Y from 1072-14), a method 1072 can determine if it is the last on-board STA associated with the AP 1072-16. If the disconnecting STA is not the last on-board STA (N from 1072-16) a method 1072 can return to 1072-4 to adjust the CFP/CAP accordingly. If the disconnecting STA is the last on-board STA (Y from 1072-16) a method 1072 can stop the CFP/CAP for the on-board STAs. The resulting free time in the interval can be yielded to other devices (e.g., contention based data transfers). The on-board device can then be disconnected 1072-20.

If an associating STA is not an on-board STA (N from 1072-2), a method 1072 can associate with the device in a conventional fashion and schedule or allow data transfers for the STA at a lower priority than on-board STAs 1072-22. If the associating STA has QoS requirements, they can be addressed with conventional QoS procedures, such as EDCA as but one example.

Figure 11:
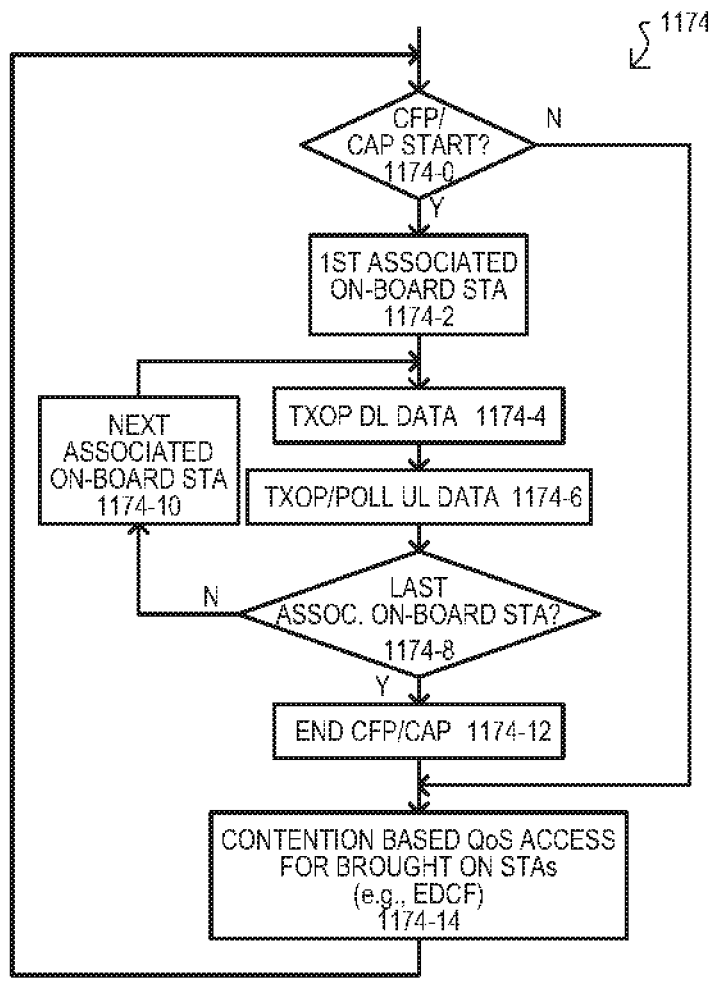
FIG. 11 is a flow diagram of method for transferring data to on-board STAs in a CFP according to an embodiment.

FIG. 11 is a flow diagram of a method 1174 according to another embodiment. A method 1174 can be executed by an AP for data transfers with on-board STAs. A method 1174 can include determining if a reserved time period for the on-board STAs is starting. In the embodiment shown, this can include determining if a CFP or CAP scheduled for on-board STAs is to start 1174-0. Such an action can include comparing a timer to a CFP/CAP schedule maintained by the AP when on-board STAs are associates with the AP. If an on-board STA CFP/CAP is scheduled (Y from 1174-0), a data transfer can start with a first scheduled on-board STA 1174-2. The CFP/CAP can include a TXOP for DL data from the AP to the on-board STA 1174-4. The CFP/CAP can also include a TXOP for UL data (and a poll if needed by the protocol) from on-board STA to the AP 1174-6. The transfer of UL and DL data can continue for each associated on-board STA (N from 1174-8, -10, -4, -6).

When a last on-board STA is serviced (Y from 1174-8), a method 1174 can end the CFP/CAP 1174-12. Such an action can include the AP issuing a CF end transmission. Once the CFP/CAP ends, a method 1174 can switch to establishing QoS for brought-in STAs through a contention/admission process (e.g., EDCF) 1174-14.

Figure 12:
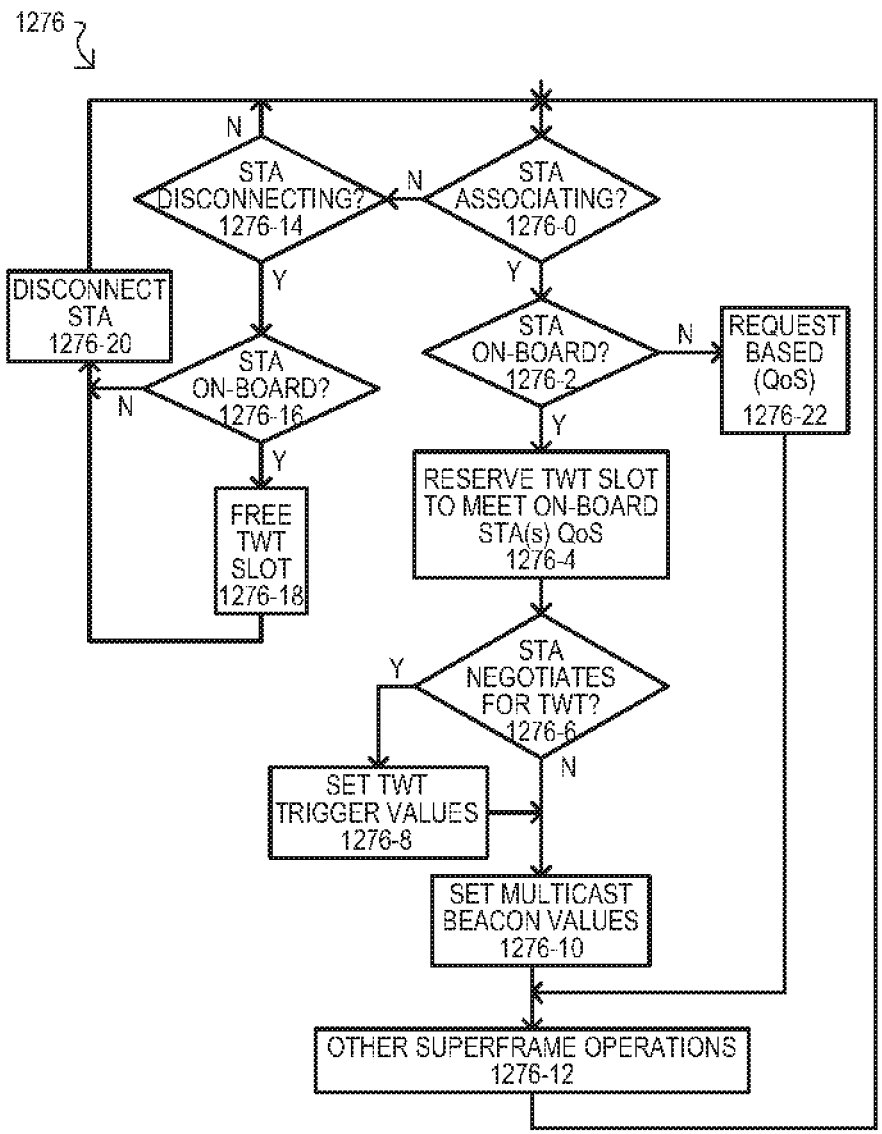
FIG. 12 is a flow diagram of method for scheduling TWTs for on-board STAs on according to an embodiment.

FIG. 12 is a flow diagram of a method 1276 according to another embodiment. A method 1276 can be executed by an AP that can schedule TWTs, including but not limited to an AP that is compatible with the IEEE 802.11ax standard. As in the case of FIG. 10, an AP can have a configuration block that stores information for a set of on-board STAs in nonvolatile memory, including MAC addresses QoS values.

A method 1276 can include determining if a STA is associating with the AP 1276-0 and if it is an on-board STA 1276-2. Such actions can be the same or similar to those shown as 1072-0/2 in FIG. 10. If the STA is an on-board STA (Y from 1276-2), an AP can reserve a TWT slot of sufficient duration and frequency to meet the QoS of the on-board STA 1276-4.

A method 1276 can determine if an on-board STA is making an individual TWT negotiation 1276-6. If an individual TWT negotiation is being made by the on-board STA (Y from 1276-6), a method 1276 can schedule a trigger for the TWT 1276-8. In both an individual TWT negotiation and AP broadcast case, a method 1276 can set the values of a broadcasted schedule for the TWTs 1276-10.

A method 1276 can then execute other superframe operations 1276-12.

A method 1276 can also include determining if a STA is disconnecting from the AP 1276-14. If a STA is disconnecting (Y from 1276-14), a method 1276 can determine if it is an on-board STA 1276-16. If the disconnecting STA is not an on-board STA (N from 1276-16), the STA can be disconnected 1276-20. If the disconnecting STA is an on-board STA (Y from 1276-16), a method 1276 can free the TWT of the disconnecting on-board STA 1276-18. The on-board device can then be disconnected 1276-20.

If an associating STA is not an on-board STA, a method 1276 can associate with the device in a conventional fashion and schedule or allow data transfers for such STAs at a lower priority than on-board STAs 1276-22. If the associating STA has QoS requirements, they can be addressed with conventional QoS procedures, such as EDCA as but one example.

Figure 13:
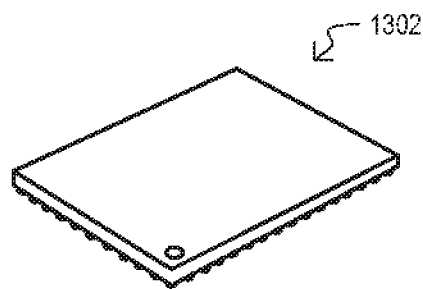
FIG. 13 is a diagram of a device according to an embodiment.

While embodiments can include systems with various interconnected components, embodiments can also include unitary devices which can enable an AP to provide conditional QoS scheduling depending upon whether an associating device is an on-board STA as described herein, and equivalents. In some embodiments, such unitary devices can be advantageously compact single integrated circuits (i.e., chips). FIG. 13 show one particular example of a packaged single chip wireless device 1302. Such a device 1302 can include circuits for providing the AP functions described herein and equivalents.

However, it is understood that a device according to embodiments can include any other suitable integrated circuit packaging type, as well as direct bonding of a device chip onto a circuit board or substrate.

While embodiments can be directed toward a wide variety of applications, some embodiments can include automobile wireless systems. Embodiments can include an automobile Wi-Fi system with an AP (including a soft AP) and a number of STAs installed as on-board devices, or any other similar environment or site Wi-Fi systems with on-board devices. Unlike conventional systems, such embodiments can include a configuration parameter block having the MAC addresses and required bandwidth (to meet a QoS) of the on-board Wi-Fi STAs. The system can automatically switch to any Wi-Fi BSS where the AP needs to serve both "in-system" (e.g., on-board) STAs and visiting (e.g., brought-in) STAs, or in any Wi-Fi BSS that suffers contention with overlapping BSSs. "In-system" STA MAC addresses and required bandwidth can be programmed into a parameter block of the AP. The AP can then monitor if any "in-system" STA associates with it. If there is one or more, the AP can start running HCCA to schedule CFP or TWT with reserved bandwidth for such STA. As a result, the "in-system" STA's data can receive a desired QoS treatment in an automatic fashion.

Figure 14:
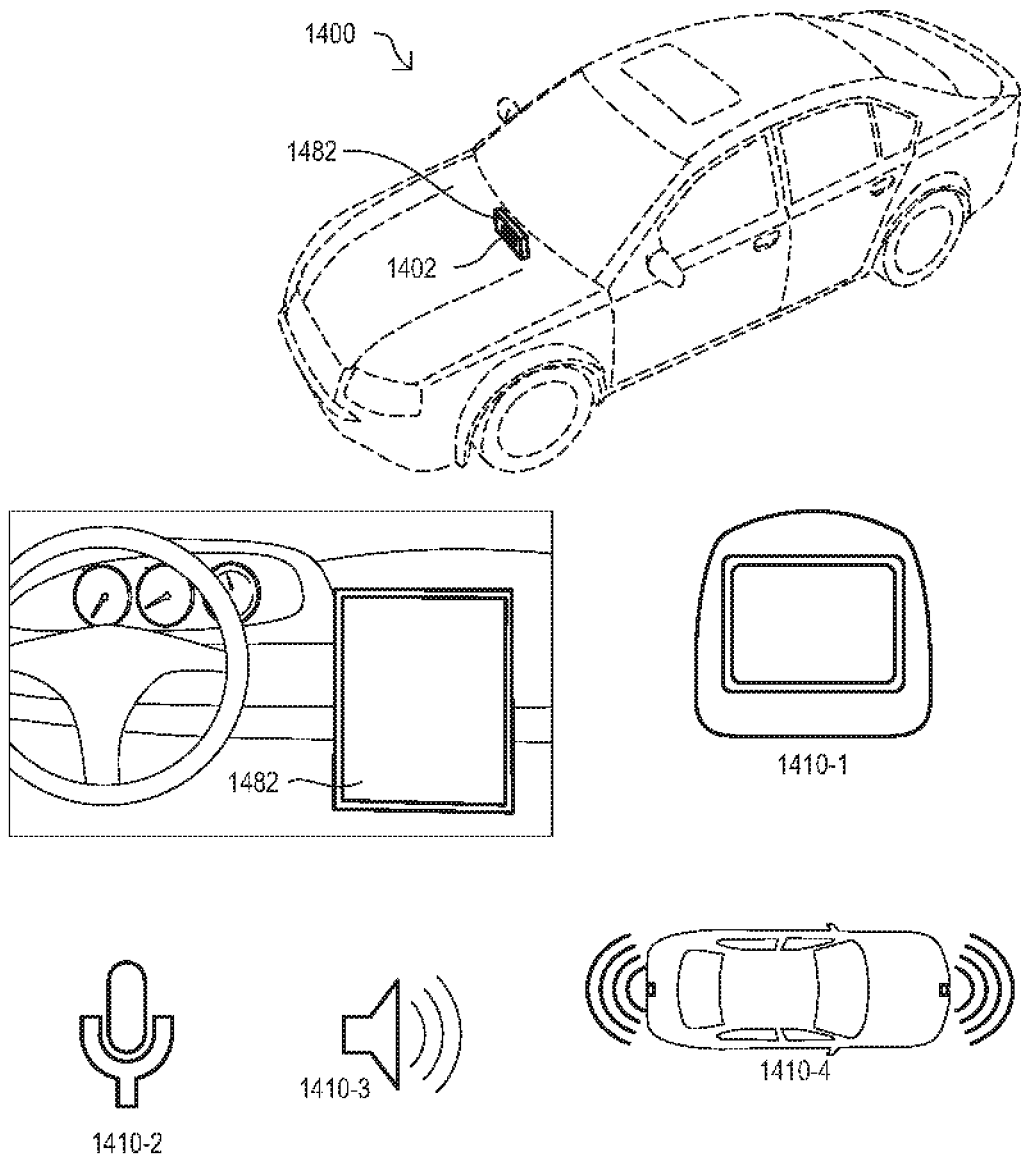
FIG. 14 is a diagram of an automobile wireless system according to an embodiment.

FIG. 14 shows a system 1400 that includes an automobile wireless system 1482 that can be configured to include a soft AP 1402. A soft AP 1402 can enable wireless transfers between various devices having wireless communication abilities that are deployed in an automobile. Such device can be considered STAs of the system 1400. While on-board STAs can take any suitable form, FIG. 14 shows a back seat display console 1410-1, a microphone 1410-2, a speaker 1410-3, and sensors 1410-4. Any or all such devices can be considered on-board STAs that can have QoS requirements, and thus have their MAC address and QoS values stored in a configuration block of the soft AP 1402. However, in some embodiments devices having streaming data requirements can be considered on-board STAs. Accordingly, console 1410-1, microphone 1410-2 and speaker 1410-3 can be on-board STAs, while other devices may not (and thus not be allocated bandwidth upon association).

Figure 15:
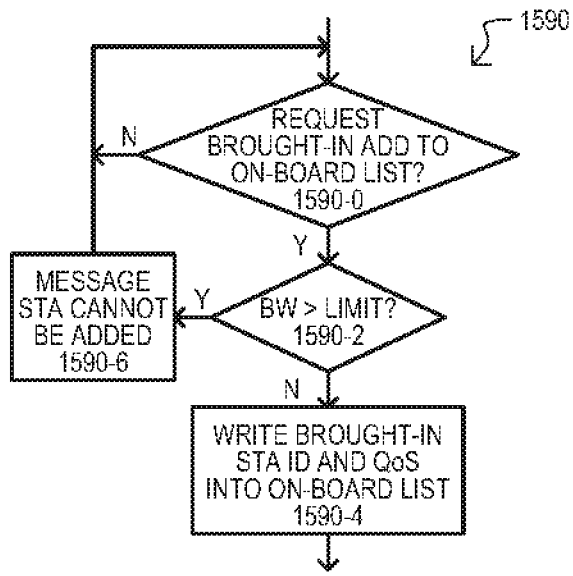
FIG. 15 is a flow diagram of a method for adding a brought-in device to an on-board list according to an embodiment.
Figures 16A, 16B:
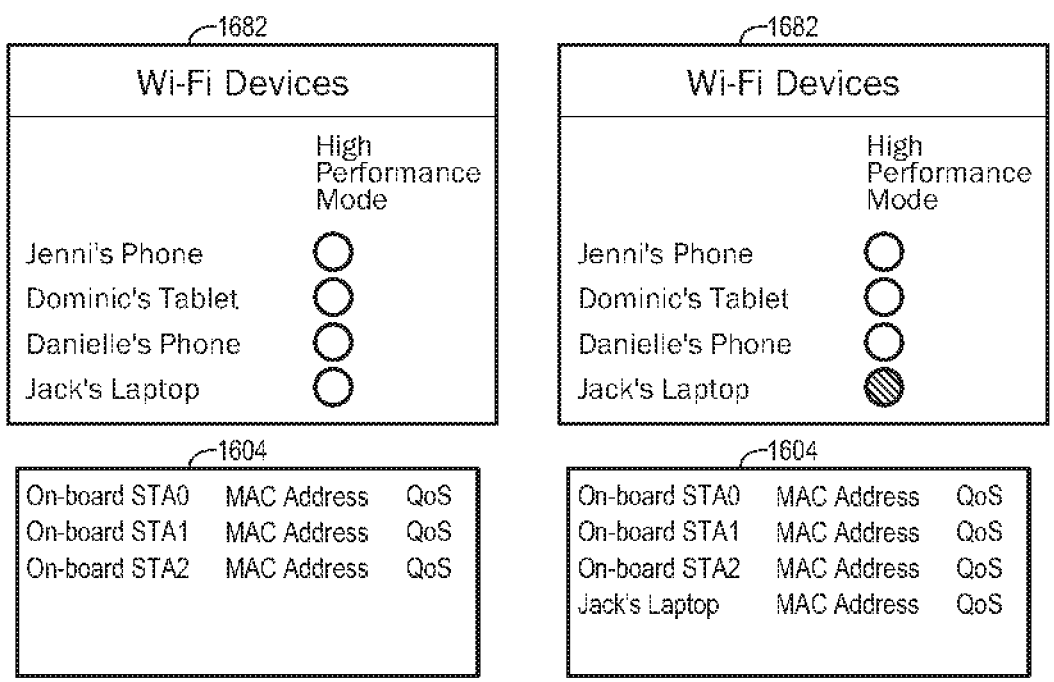
FIGS. 16A and 16B are diagrams showing interface operations according to an embodiment.

In some embodiments, a system can anticipate having additional bandwidth even after all on-board devices have been assigned time allocations for their given QoS. In such embodiments it can be possible to allow one or more other (i.e., not on-board) STAs to be added to an on-board list, and thus be given the same priority QoS as on-board STAs. FIGS. 15 to 16B show an example of such an embodiment.

FIG. 15 is a flow diagram of a method 1590 for adding a brought-in device to an on-board QoS priority list according to an embodiment. A method 1590 can include receiving a request from a brought-in STA to be added to an on-board list 1590-0. In some embodiments, such an action can include a user providing data to an application executed by the system (e.g., an infotainment interface). Further, such an action can include an AP receiving an identifier (e.g., MAC address) and QoS requirement for the brought-in STA. A QoS requirement (e.g., bandwidth) for the requesting device can be compared to available bandwidth 1590-2. It is understood that an available bandwidth can be bandwidth that would be left assuming all on-board STAs are connected and provided with their QoS. If sufficient bandwidth remains for the requesting device (N from 1590-2) the information for the requesting STA can be written into the list of the on-board STAs. This can include programming nonvolatile memory with the MAC address and QoS data of the requesting device.

If there is not sufficient bandwidth for the requesting device (Y from 1590-2), a message can be generated that the requesting STA cannot be added.

FIGS. 16A and 16B are diagrams showing one example for adding a brought-in device to a priority QoS list of on-board devices. FIGS. 16A and 16B show a system interface 1682 and a nonvolatile memory 1604 of an AP. In FIG. 16A brought-in STAs can be identified with an interface that allows selection of brought-in STA. FIG. 16B shows how the selection of one brought-in STA (Jack's Laptop) can result in the information for the brought-in STA (i.e., MAC address and QoS requirement) can be added to the on-board list 1604. Such an action can include the programming of data into nonvolatile memory of the AP.

Alternate embodiments can include methods in which an AP can control admissions of STAs to a network based on requested QoS (e.g., HCCA), however, the AP can also dismiss non-on-board STAs that are already admitted in order to guarantee bandwidth for on-board STAs when such on-board STAs subsequently associate with the AP.

Figure 17:
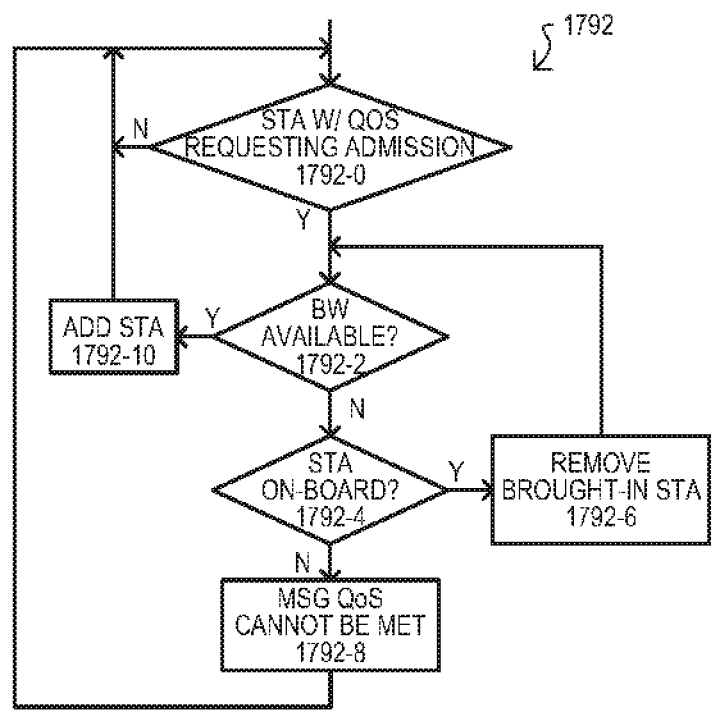
FIG. 17 is a flow diagram of a method according to another embodiment.

FIG. 17 is a flow diagram of such an embodiment. FIG. 17 shows a method 1792 that can be executed by an AP. In some embodiments, a method 1792 can be implemented with HCCA. A method 1792 can include determining when the AP receives a request from a STA having a QoS requirement to be admitted to a system 1792-0. If an AP receives such a request (Y from 1792-0), a method 1792 can include the AP determining if sufficient bandwidth exists to meet the QoS of the STA 1792-2. If bandwidth is available (Y from 1792-2) a method 1792 can add the STA 1792-10. If bandwidth is not available (N from 1792-2) a method 1792 can determine if the requesting STA is an on-board STA 1792-4. Such an action can include any of those described herein or equivalents. If the requesting STA is not an on-board STA (N from 1792-4) the requesting STA can be informed that the QoS cannot be met 1792-8. In some embodiments such an action can include HCCA procedures.

In contrast, if the requesting STA is an on-board STA (Y from 1792-4) the AP can remove a brought-in device 1792-6. A method 1792 can again determine if enough bandwidth is available (with an on-board STA removed) 1792-2. Brought-in devices can continue to be removed 1792-6 until the on-board device can be added 1792-10.

Embodiments can reserve bandwidth for on-board STAs using parameters in soft AP firmware, and allocate the bandwidth to the on-board STAs once they are associating with the soft AP. In some embodiments, such soft APs can use HCCA without complicated admission control for QoS assurance in a general Wi-Fi BSS or TWT for power-saving QoS assurance in 802.11ax Wi-Fi BSS. Such approaches can provide a significant improvement to conventional approaches, such as EDCA for QoS assurance in general Wi-Fi BSS or TWT for power-saving QoS assurance in 802.11ax Wi-Fi BSS.

Embodiments described herein are in contrast to conventional systems in which on-board STAs contend with brought-in STAs. By prioritizing on-board STAs by allocating bandwidth upon association, data transfers for on-board STA data can receive the desired QoS treatment, including near guaranteed bandwidth as specified in a configuration parameter block of the system AP.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
by operation of a station (STA) having a predetermined quality-of-service (QoS) requirement,
storing a unique identifier for the STA in a nonvolatile memory of the STA,
associating with an access point (AP) with transmissions that include the unique identifier, and
after associating with the AP, receiving and transmitting data in at least one period that provides a QoS corresponding to the QoS requirement without having transmitted a corresponding QoS value to the AP during or after associating with the AP.

2. The method of claim 1, wherein the unique identifier for the STA comprises a media access control (MAC) address.

3. The method of claim 1, wherein the QoS requirement for the STA comprises a bandwidth requirement.

4. The method of claim 1, wherein the STA is compatible with at least one IEEE 802.11 wireless standard.

5. The method of claim 1, further including:
by operation of the STA,
storing a QoS value corresponding to the QoS corresponding to the QoS requirement,
in an operation prior to the associating with the AP, requesting to be added to a list of STAs of the AP that have ensured QoS, the requesting including the unique identifier and a QoS value of the STA.

6. The method of claim 1, wherein:
the at least one period includes
a transmit opportunity (TXOP) for data from the AP to the STA, and
a TXOP for data from the STA to the AP,
wherein the TXOPs having durations sufficient to meet the QoS requirement.

7. The method of claim 1, wherein:
the at least one period is part of contention free period within a larger contention period; wherein
the contention free period is at least one time period in which only assigned STAs can access to a transmission medium, and
the contention period is at least one time period in which any STA can negotiate with the AP for access to the medium.

8. The method of claim 1, further including:
after associating with the AP, but before receiving and transmitting data in the at least one period,
receiving data from the AP identifying assignment of the at least one period to the STA; and
in response to not receiving data from the AP identifying assignment of the at least one period to the STA, negotiating with the AP to establish a negotiated QoS.

9. A device, comprising:
memory circuits comprising nonvolatile memory circuits configured to store a unique identifier and a quality-of-service (QoS) requirement; and
wireless communication circuits configured to
execute an association operation with an access point (AP) that provides the unique identifier and not the QoS requirement, and
after executing the association operation with the AP, receiving and transmitting data in at least one period that provide the a QoS corresponding to the QoS requirement without having transmitted a corresponding QoS value to the AP during or after associating with the AP; wherein
the device is a station (STA) compatible with at least one IEEE 802.11 wireless standard.

10. The device of claim 9, wherein the unique identifier comprises a media access control (MAC) address.

11. The device of claim 9, wherein the QoS requirement for the STA comprises a bandwidth requirement.

12. The device of claim 9, wherein:
the memory circuits are configured to store different data for transmission; and
the wireless communication circuits are configured to prioritize at least one type of data over the other types of data for transmission during the at least one period.

13. The device of claim 12, wherein the at least one type of data is selected from the group of: audio and video data.

14. The device of claim 9, wherein:
the at least one period is selected target wake times from a plurality of periodic target wake times; and
the device is configured to enter a sleep mode between the selected target wake times.

15. A system, comprising:
a plurality of first type stations (STAs) configured for wireless communication, each first type STA including
memory circuits configured to store a unique identifier for the first type STA,
a different first type quality-of-service (QoS) requirement for data transfer operations, and
wireless control circuits configured to
associate with an access point (AP) with the unique identifier and without conveying the first type QoS requirement, and
after associating with the AP, receive and transmit data in at least one period that provides the first type QoS requirement for the STA.

16. The system of claim 15, further including:
at least one second type STA configured for wireless communication, the at least one second type STA including
a second-type QoS, and
wireless control circuits configured to associate with the AP, including negotiating an approved QoS using the second-type predetermined QoS.

17. The system of claim 15, wherein the first type STAs are compatible with at least one IEEE 802.11 wireless standard.

18. The system of claim 15, wherein the first-type STAs comprise built-in STAs that are built into a larger system.

19. The system of claim 18, wherein the larger system comprises an automobile system.

20. The system of claim 15, wherein:
the at least one period includes, for each first-type STA,
a transmit opportunity (TXOP) for data from the AP to the first-type STA, and
a TXOP for data from the first-type STA to the AP, wherein
the TXOPs having durations sufficient to meet the first type QoS of the STA, and
the TXOPs for each first type STA occupy different periods of time.

* * * * *